United States Patent [19]
Gururangan

[11] Patent Number: 5,160,865
[45] Date of Patent: Nov. 3, 1992

[54] DISK ASSEMBLY WITH THERMALLY ISOLATED IN-HUB SPINDLE MOTOR

[75] Inventor: Raghuraman Gururangan, San Jose, Calif.

[73] Assignee: Quantum Corporation, Milpitas, Calif.

[21] Appl. No.: 753,003

[22] Filed: Aug. 23, 1991

Related U.S. Application Data

[63] Continuation of Ser. No. 620,576, Dec. 3, 1990, abandoned.

[51] Int. Cl.[5] .................. H02K 5/00; G11B 17/14
[52] U.S. Cl. ........................... 310/67 R; 310/156; 360/98.07
[58] Field of Search ............. 360/98.07, 98.08, 99.07, 360/99.08; 310/67 R, 89, 154, 156, 261, 90; 384/589

[56] References Cited

U.S. PATENT DOCUMENTS

| | | | |
|---|---|---|---|
| 4,607,182 | 8/1986 | Ballhaus | 310/90 |
| 4,672,250 | 6/1987 | Seitz | 310/90 |
| 4,672,488 | 6/1987 | Wright | 360/98 |
| 4,694,213 | 9/1987 | Gowdz et al. | 310/90 |
| 4,717,977 | 1/1988 | Brown | 360/98.08 |
| 4,739,427 | 4/1988 | Kilmer et al. | 360/97 |
| 4,764,828 | 8/1988 | Gollbach | 360/98 |
| 4,814,652 | 3/1989 | Wright | 360/98.07 |
| 4,829,657 | 5/1989 | Wright | 29/596 |
| 4,905,110 | 2/1990 | Krum et al. | 360/99.08 |
| 4,928,029 | 5/1990 | Wright | 310/87 |
| 4,965,476 | 10/1990 | Lin | 310/51 |
| 4,965,686 | 10/1990 | Young et al. | 360/98.07 |
| 4,980,587 | 12/1990 | Yonei et al. | 310/67 R |
| 5,031,061 | 7/1991 | Hatch | 360/98.07 |

FOREIGN PATENT DOCUMENTS 60-193156 10/1985 Japan .

Primary Examiner—Steven L. Stephan
Assistant Examiner—D. R. Haszko
Attorney, Agent, or Firm—David B. Harrison

[57] ABSTRACT

A brushless DC, in-the-hub spindle motor for a multi-disk micro-Winchester disk drive includes a fixed stator structure secured to the motor spindle. A lower support wall is journalled to a fixed central shaft via a lower bearing. The lower support wall defines two outer steps, an inner upper step, and a lower, outer step. A flux return ring is mounted on the inner step is spaced away relation to a disk hub which is mounted on the outer step, so that thermal expansion of the flux return ring occurs in the resultant space without deformation or distortion of the disk hub. The hub may be journalled to the shaft by an upper bearing.

7 Claims, 3 Drawing Sheets

DISK ASSEMBLY WITH THERMALLY ISOLATED IN-HUB STINDLE MOTOR

This application is a continuation of application Ser. No. 07/620,570, filed Dec. 3, 1990.

FIELD OF THE INVENTION

The present invention relates to a brushless DC motor. The motor is particularly applicable as a direct drive spindle motor within a multi-disk fixed disk drive because the architecture of the flux return structure reduces the change in repeatable run out over temperature otherwise caused by the different thermal expansion characteristics of the motor components.

BACKGROUND OF THE INVENTION

Direct drive, brushless DC spindle motors are known in the art for mounting rigid data storage disks for rotation. The disks are mounted around a hub or external rotor which is, in turn, mounted on the spindle of the motor. The motor components may be external to the spindle so that belts or other drive methods are used to rotate the spindle; or, the motor may be formed entirely within the spindle and hub assembly, as in a high capacity micro-Winchester disk drive.

The micro-Winchester disk drives have to work over a range of temperatures (typically 2 degrees C. to 55 degrees C.). This temperature variation, in addition to the heat generated internally, causes the assembly to expand according to the coefficients of expansion of the various materials forming the assembly components. As an example, the motor typically requires that a magnetic flux return path, also known as a yoke, be provided. Such a path is usually provided by a magnetic flux-carrying material, such as a rare earth ferroceramic element, or low carbon steel. In contrast, the hub or rotor, the bearing mounts for the spindle, and the base support for the motor are typically constructed from an aluminum alloy. The rigid storage disks mounted around the hub are generally made of aluminum and are coated with a suitable data storage medium.

In assembly of the motor, the yoke is typically attached to the inner surface of the aluminum alloy hub by bonding or gluing. Starting at the outer portion of the disk drive motor and progressing inwardly, the following contiguous materials are encountered: aluminum disks, the aluminum alloy hub, the yoke e.g. steel alloy flux return ring bonded to a portion of the aluminum alloy hub, aluminum bearing holder, bearing outer race, and the steel shaft. The coefficient of thermal expansion of low carbon steel is approximately six to nine microinches per degree Fahrenheit while that of an aluminum alloy hub having a low carbon steel yoke bonded to it is approximately 9 microinches per degree Fahrenheit. The aluminum disk coefficient of thermal expansion is approximately 13 microinches per degree Fahrenheit.

Changes in temperature within the motor during operation of the disk drive cause expansion and contraction of the hub and the magnetic flux return material. The hub tends to expand axially and radially outwardly with heat. The differences in the thermal expansion coefficients will result in more expansion and contraction of the aluminum alloy hub than that of the yoke material. Expansion and/or warpage may result at the interface between the different materials thereby interfering with optimal motor and disk drive performance e.g. causing change in the repeatable run out over temperature.

One prior approach to compensate for warping at the interface e.g. between the yoke and the hub has been to decrease the area of the bond in order to leave a gap between the aluminum and the steel to accommodate the disparate expansion characteristics. Another approach has been to shrink fit the aluminum over steel over a small portion thereby creating a connecting bead. One example of the second prior art approach is found in U.S. Pat. No. 4,717,977 to Brown.

SUMMARY OF THE INVENTION WITH OBJECTS

A general object of the present invention is to provide a low cost method and apparatus to prevent warpage at the yoke material to hub interface in brushless DC motors in a manner which overcomes the limitations and drawbacks of the prior art.

A specific object of the present invention is to provide an in-hub, direct drive, brushless DC spindle motor for a disk drive wherein the yoke material is attached to the motor components rather than to the hub or rotor assembly.

Another specific object of the present invention is to provide an in-hub brushless DC spindle motor for a multi-disk micro-Winchester disk drive wherein the magnetic return material is aligned and attached at one end to a lower rotating wall structure of the motor and wherein the hub is also aligned and attached to the same lower rotating wall in a manner defining a cylindrical space between the flux return ring and the outer hub, thereby eliminating a distortion interface between the flux return ring material and motor hub.

Still another specific object of the present invention is to provide an in-hub brushless DC spindle motor for a rigid disk drive wherein the flux return structure is relatively free floating so that thermal expansion of the structure does not affect the motor hub and the disk drive performance.

In accordance with the present invention, a brushless DC, in-hub spindle motor is provided for a multi-disk micro-Winchester or smaller disk drive. The plural-phase motor includes a fixed stator structure that is secured to the motor spindle shaft. An aluminum alloy ball bearing holder is also journalled via a lower bearing assembly to the motor spindle below the stator assembly. The lower wall defines a plurality of peripheral steps: an upper inner step for aligning and securing the flux return ring, and a lower outer step for aligning and securing the hub. The flux return ring is mounted to the upper inner step to position the permanent magnet or magnets adjacent to the stator. The disk hub is mounted to the lower outer step. There is a predetermined separation or gap between the flux return ring, and the hub, so that the flux return ring or structure is "floating" with respect to the surrounding hub. Any thermal effects such as expansion or warpage developing at the ring-magnetic material interface during operation of the disk drive motor will be confined to the area of the floating flux return ring and will not be transmitted to the disk hub thereby eliminating any consequent interference with motor operation and/or disk drive performance.

These and other objects, aspects, advantages and features of the present invention will be more fully understood and appreciated upon consideration of the following detailed description of a preferred embodiment, presented in conjunction with the accompanying drawings.

DESCRIPTION OF A PREFERRED EMBODIMENT

While the present invention is generally applicable within a wide variety of applications and end uses, it finds particular suitability within an in-hub, brushless DC spindle motor for a multi-disk micro-Winchester, or similar, fixed disk drive subsystem. (By micro-Winchester is meant that the nominal diameter of the storage disk is approximately 95 millimeters or 3.5 inches. Smaller diameters, such as 2.5 inches, or larger diameters, such as 5.25 inches or 8 inches, or larger disk diameters, are also within the contemplation of the present invention.)

Figure 1:
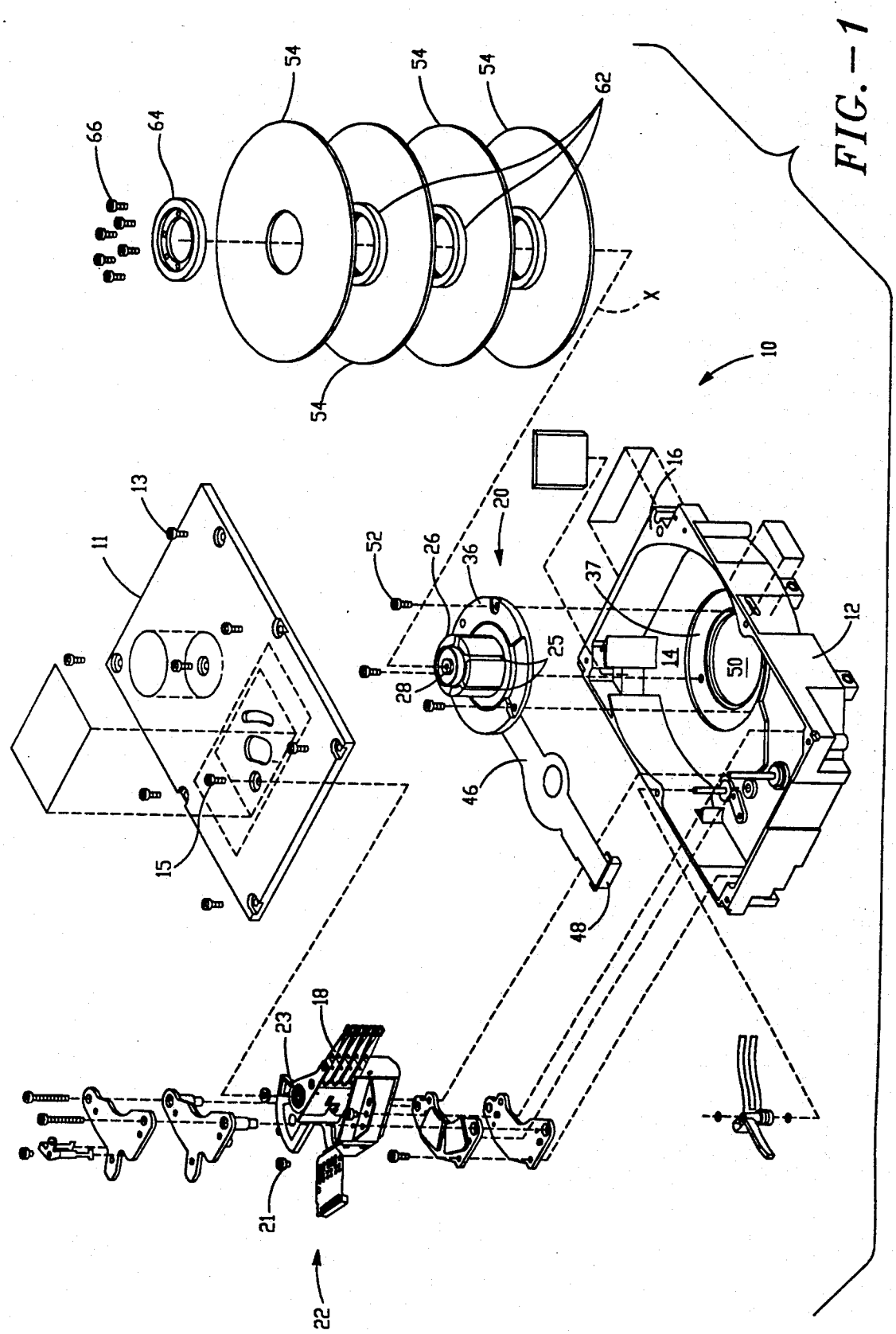
FIG. 1 is an exploded isometric view of a high capacity micro-Winchester disk drive including a disk stack and a spindle assembly and embodying the principles of the present invention.

With reference to FIG. 1, a head and disk assembly for a micro-winchester disk drive data storage subsystem is shown in exploded view along an explosion axis "X" which is also aligned with the axis of disk rotation. The head and disk assembly 10 includes a base 12 which is typically formed of cast aluminum alloy. The base 12 defines an interior space 14 which is enclosed and hermetically sealed from the ambient environment by a top cover 11 and sealing gasket (not shown) which are affixed by screws 13 to the top edge wall 16 of the base 12. The sealed environment excludes external ambient particulate and gaseous contaminants from reaching the interior space 14. A head stack 18 extends from a mass balanced rotary actuator assembly 22 which is rotatably journalled to the base 12 within the interior space 14. In order to add rigidity to an axial journal 23 of the actuator assembly 22, the journal 23 is secured e.g. by a screw 15, to the top cover, as well as being press fit into the base casting 16.

A spindle assembly 20 includes an aluminum alloy hub 26, a central shaft 28, and mounting flange 36. The mounting flange 36 is preferably mounted to a mating surface 37 within a well 50 formed in the base 12 by three mounting screws 52. Alternatively, the mounting flange 36 may be made as an integral part of the base casting 16.

For example, four data storage disks 54 define central openings which are slightly larger in diameter than the outside diameter of the hub 26. Spacers 62 fit between the disks and a disk clamp 64 clamps the disks 54 and spacers 62 as a tightened assembly over the hub 26. Screws 66 enable the disk clamp 64 to be tightened to the top of the hub 26.

Figure 3:
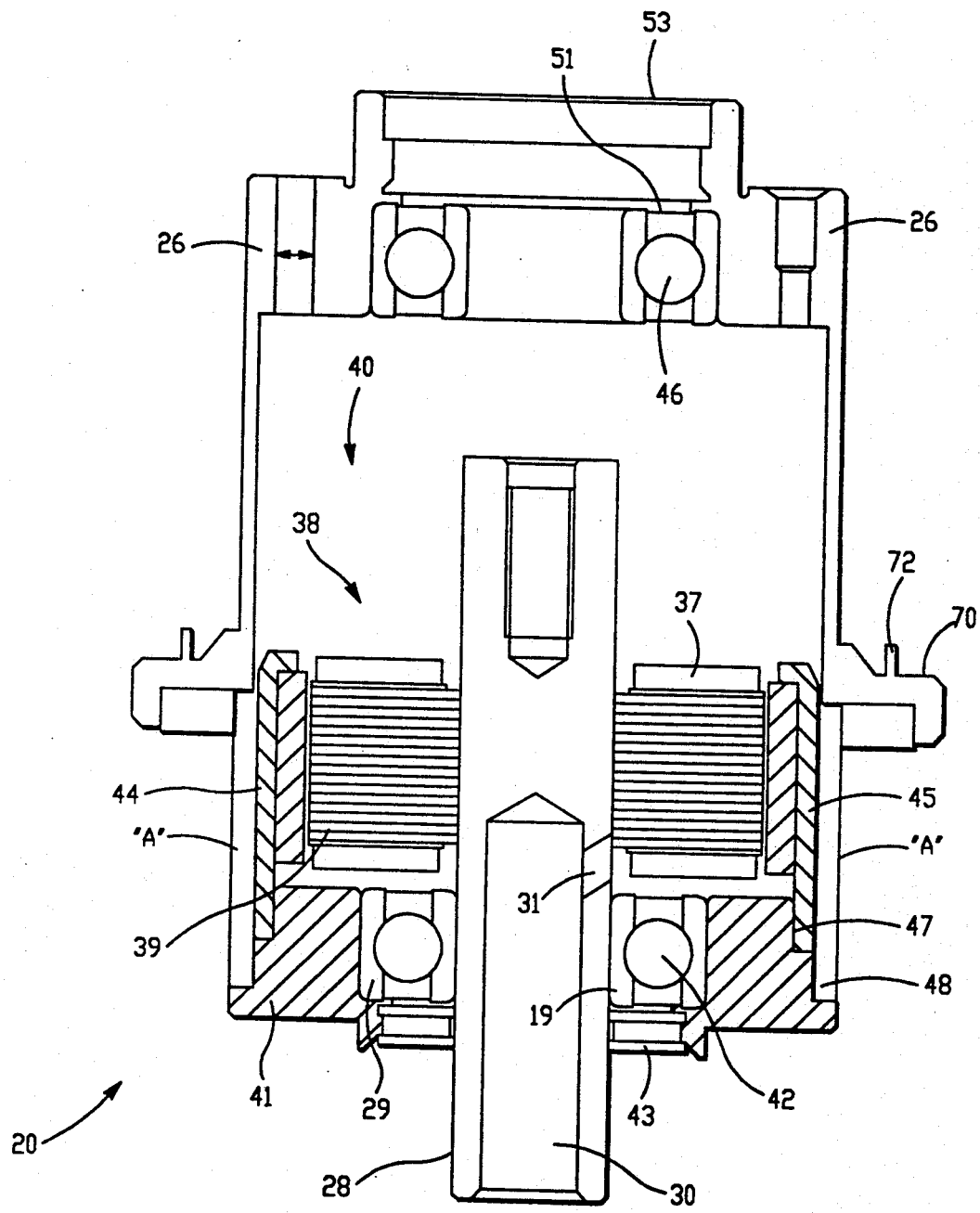
FIG. 3 is the assembly of FIG. 2 further including the disk hub assembly.

As perhaps best illustrated in FIG. 3, a flange 70 extends radially outwardly from the hub 26. The flange 70 defines an upstanding narrow annular support wall 72. An uppermost face of the support wall 72 contacts an inner annular surface of the lowermost disk 54. Central axial openings in the disks 54 are dimensioned to be slightly greater than the outside diameter of the hub 26. Thin plastic spacers 25 circumferentially arranged about the outer circumference of the hub 26 may be provided to center the disks 54 with respect to the hub 26 as well as evenly space the disks away from the outer cylindrical wall of the hub 26. In this manner, the data storage disks may thereby be "floated" over thermal gradients relative to the hub 26 in accordance with the teachings of U.S. Pat. No. 07/413,468 now U.S. Pat. No. 5,031,061 the disclosure of which is hereby incorporated by reference.

Figure 2:
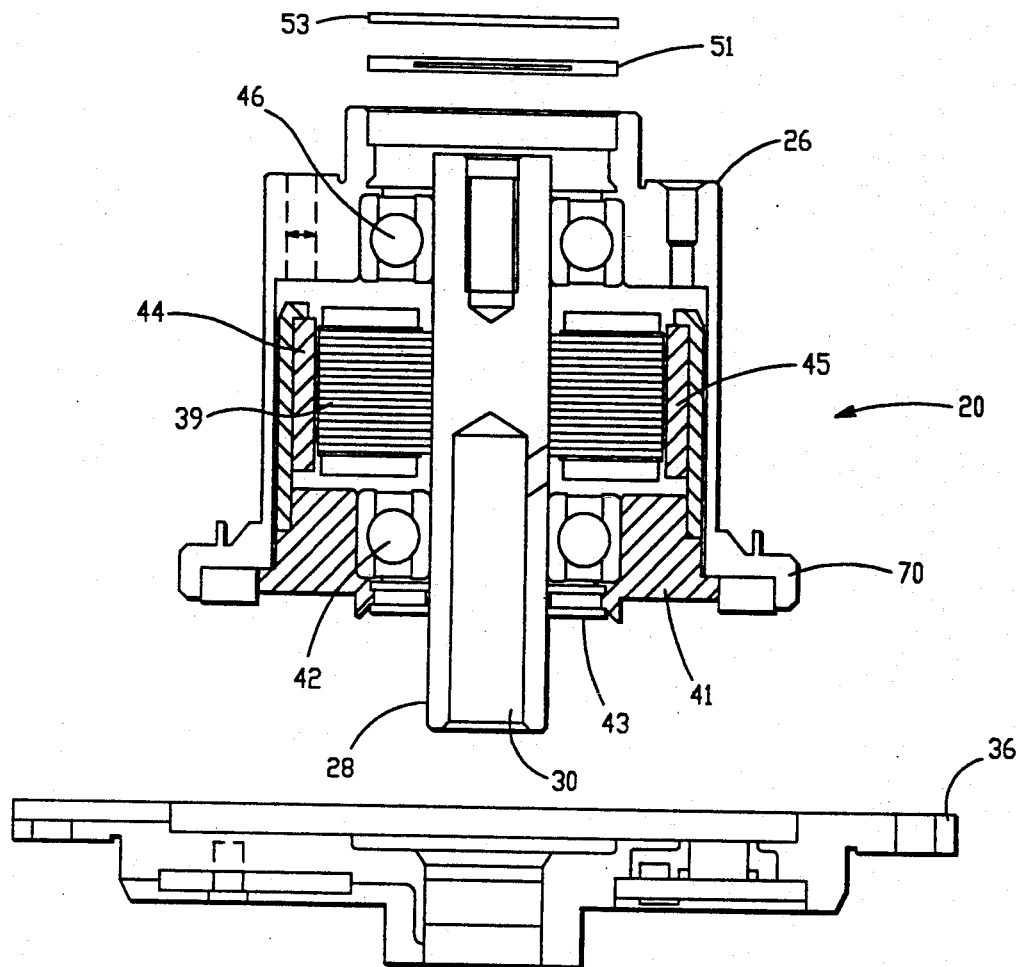
FIG. 2. is a side view in elevation and section of the architecture of the flux return structure of the present invention and mounted on a step of the bearing holder attached to a motor spindle.
Figure 4:
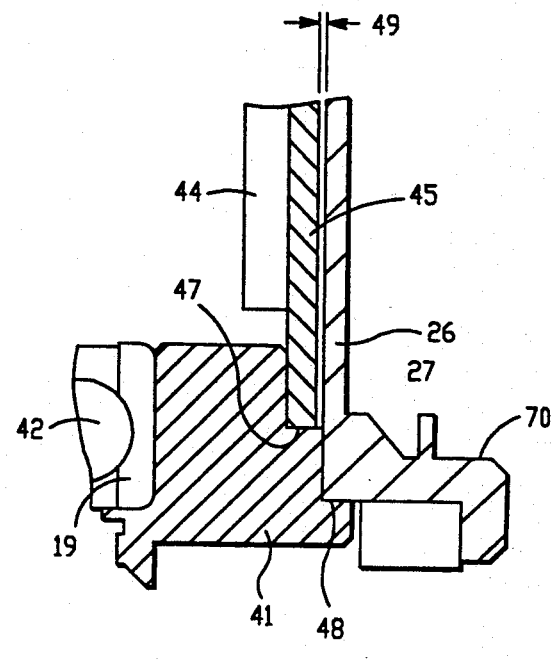
FIG. 4 is an enlarged sectional, view of the portion of FIG. 2 showing the gap between the mounted flux return ring and the mounted hub.

Referring now to FIGS. 2 and 3, a direct drive, brushless DC spindle motor 40, having e.g. three phases, is included within a central region of the spindle assembly 20. The in-hub spindle motor 40 includes e.g. three phase windings wound around a fixed stator-coil structure 38. A central longitudinal passage 30 through the shaft 28 and an angled bore 31 through the shaft 28 enable wire connections to be made from the stator coils to the exterior as by insulated wire conductors, for example. The wires preferably connect to a plastic (e.g. Mylar (tm) film) conductor strip 46 (shown in FIG. 1). The conductor strip 46 carries multiple conductors and leads to a plug 48 which enables the stator coil windings to be connected to external motor drive circuitry (not shown). Alternatively, and with equal preference, discrete insulated wires may carry the operative electrical connections to the external drive circuitry.

The mounting flange 36 may carry suitable circuitry, such as Hall effect sensors, enabling ready, reliable commutation of the multiple phases of the brushless motor 40. A motor commutation integrated circuit, such as the Hitachi HA 12441 motor driver circuit, or equivalent, may be used to provide commutated driving signals to the brushless DC motor 40 in response to commutation signals as developed by the Hall sensors in conventional fashion.

A lower cylindrical wall 41 enclose a lower ball bearing assembly 42 and has an outer race 29 thereof which is press fit or bonded into the wall 41. An inner race 19 of the bearing assembly 42 is attached to the central shaft 28 by a suitable adhesive. A ferrofluidic seal 43 is mounted to the lower cylindrical wall 42 below the bearing assembly 42. A suitable ferrofluid material provides a hermetic seal between the rotating lower cylindrical wall 41 (which rotates with the hub 26) and the stationary central shaft 28.

A premagnetized annular permanent magnet 44 is glued within an annular ferromagnetic (e.g. steel) flux return ring 45 so as to be positioned outwardly adjacent to the stator laminations 39 of the stator assembly 38 of the motor 40. The permanent magnet 44 defines a number of reversing North-South poles about its circumference which are numbered and positioned in relation to the stator poles, as is conventional in brushless DC motors. In order to develop sufficient torque, the DC motor 40 may employ a ferroceramic rare earth (e.g. neodymium alloy) material for the ring magnet 44. Instead of a continuous ring, discrete annular polarized permanent magnet pieces may be affixed to the flux return 45.

An upper bearing assembly 46 may likewise have its outer race press fit or bonded into a suitable opening of the hub 26 and its inner race affixed to the central shaft 28 by adhesive. An upper ferrofluid seal 51 is mounted within an upper well of the hub 26 above the upper bearing assembly 46 and completes the hermetic seal of the motor components within the hub 26 from the "clean" interior space of the disk drive within the base casting 16. This prevents particulates and outgasses from the spindle motor components from contaminating the data surfaces or data transducer heads within the clean interior disk drive space. A ferro fluid protective cover 53 is also provided.

In accordance with the principles of the present invention, the lower annular support wall 41 defines an outer recess or step 47 which is sized to receive a lower annular end region of the steel flux return ring 45 in a press fit or bonding engagement. A suitable adhesive may be used to secure the lower annular end of the steel flux return ring 45 to the e.g. aluminum alloy lower annular support wall 41. The step 47 is precisely formed, as by machining, and its geometry controls the alignment of the flux return ring 45. A similar step 48 is also formed in the lower annular support wall 41 for receiving in a precise alignment a lower skirt region 27 of the hub 26. When assembled, the lower annular support wall 41 not only aligns, secures and supports the steel flux return ring 45, it also aligns, secures and supports the hub 26.

The outer diameter dimension of the flux return ring 45 is designed to be slightly smaller than the inside diameter dimension of the hub 26 so that a minute space exists between the e.g. steel flux return ring 45 and the aluminum alloy hub 26. Over thermal gradients, the steel flux return ring 45 is therefore able to expand slightly without coming into contact with, and thereby exerting any distortion force upon, the aluminum alloy hub 26. The spacing between the flux return ring 45 and the hub 26 must be sufficient to take into account the differences in thermal expansion rates of the hub 26 and ring 45, and the machining tolerances associated in the manufacture of these components and the lower support wall 41.

Referring again to FIG. 3, the aluminum alloy disk hub 26 is shown separated from the lower annular support wall 41 along separation dashed lines "A". The predetermined space or gap between the hub 26 and the flux return ring 45 is denoted by reference numeral 49. As already noted, the gap 49 provides sufficient clearance to accommodate expansion or contraction of the "floating" flux return ring 45 and its magnet 44 in response to thermal changes without affecting the contiguously surrounding, but non-touching hub 26. Any effects from warpage developing at the interface between the steel alloy flux return ring 45 and the magnet (or magnets) 44 will be confined to the clearance area or gap 49, thereby preventing interference either with operation of the spindle motor 40 or with rotation and alignment of the disks 54.

Although the presently preferred embodiment of the invention has been illustrated and discussed herein, it is contemplated that various changes and modifications will be immediately apparent to those skilled in the art after reading the foregoing description in conjunction with the drawings. For example, other suitable materials may be used for the disk hub 26, the flux return ring 45, the magnet 44, and the shaft may be of steel or aluminum. The ring 45 may be attached to the step 47 by other suitable methods and materials, such as thermal shrink fitting. Accordingly, it is intended that the description herein is by way of illustration only and should not be deemed limiting the invention, the scope of which being more particularly specified and pointed out by the following claims.

What is claimed is:

1. A disk spindle hub assembly for a rigid disk drive including a base means, a central mounting shaft means extending upwardly from the base for a predetermined length, a fixed stator assembly means including a plurality of coil windings and being mounted to and extending radially outwardly from a region of said shaft means, lower bearing means mounted to said shaft means between said fixed stator assembly means and said base means, lower cylindrical wall means rotatably journalled to said shaft means via said lower bearing means, permanent magnet means outwardly facing the fixed stator assembly means, substantially cylindrical magnet support and flux return path means formed of ferromagnetic material for securing and positioning said permanent magnet means and for containing and returning magnetic fields therefrom and having a lower annular end region secured to an inner annular region of said lower cylindrical wall means, disk hub means formed of non-ferromagnetic material and including a substantially cylindrical body portion having a lower skirt region secured to an outer annular region of said lower cylindrical wall means, the cylindrical body portion and the magnet support and flux return path means defining a continuous, thermally isolating cylindrical air space extending continuously upwardly from said lower cylindrical wall means and throughout the height dimension of the magnet support and flux return path means, said disk means for mounting at least one data storage disk means and for rotating said data storage disk means in response to rotational force generated by magnetic field interaction between fields of said permanent magnet means and said fixed stator assembly means as driving currents are passed through said coils.

2. The disk spindle hub assembly set forth in claim 1 further comprising upper bearing means mounted to said shaft means above said fixed stator assembly means and wherein the disk hub means includes an upper cylindrical portion defining an axial opening for receiving and securing to said upper bearing means, said hub means being rotatably journalled to said shaft means through said upper bearing means as well as through said lower cylindrical wall means and said lower bearing means.

3. The disk spindle hub assembly set forth in claim 1 wherein the disk hub means includes a lower flange means for supporting said disk, and further comprising disk clamp means attached to the upper cylindrical portion of the disk hub means for clamping the data storage disk to the lower flange means.

4. The disk spindle hub assembly set forth in claim 1 wherein the disk hub means includes a lower flange means, and further comprising a stack of plural, axially aligned, data storage disk means mounted to said disk hub means, spacer means disposed between adjacent ones of said storage disk means for spacing them apart, the lowermost one of said stack being mounted to said lower flange means, and disk clamp means attached to the upper cylindrical portion of the disk hub means for clamping the uppermost one of said stack thereby to secure it to the disk hub means.

5. The disk spindle hub assembly set forth in claim 4 wherein the stack of data storage disk means is spaced away from an outer cylindrical wall portion of said disk hub means by resilient spacer means for maintaining said stack in axial alignment with said disk hub means.

6. The disk spindle hub assembly set forth in claim 5 whrein said resilient spacer means includes a plurality of circumferentially spaced apart, downwardly dependent resilient spacer fingers.

7. The disk spindle hub assembly set forth in claim 1 wherein the inner annular region of the lower cylindrical wall means comprises an upper peripheral annular step, and wherein the outer annular region of the lower cylindrical wall means comprises a lower peripheral annular step.

* * * * *